Feb. 6, 1934.     S. F. BRIGGS     1,945,801
VEHICLE LEAF SPRING CONSTRUCTION
Filed July 20, 1932
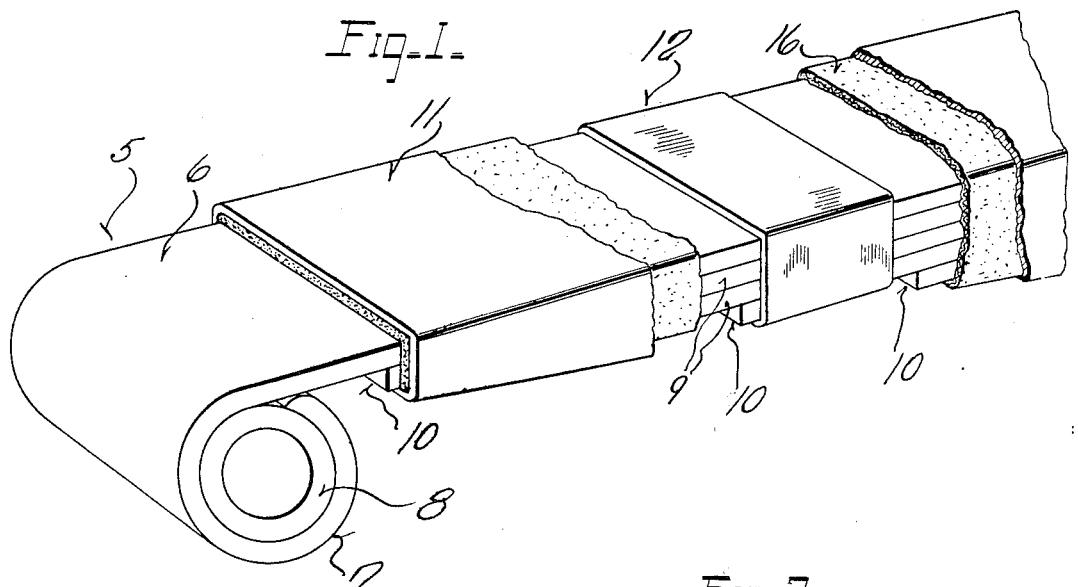
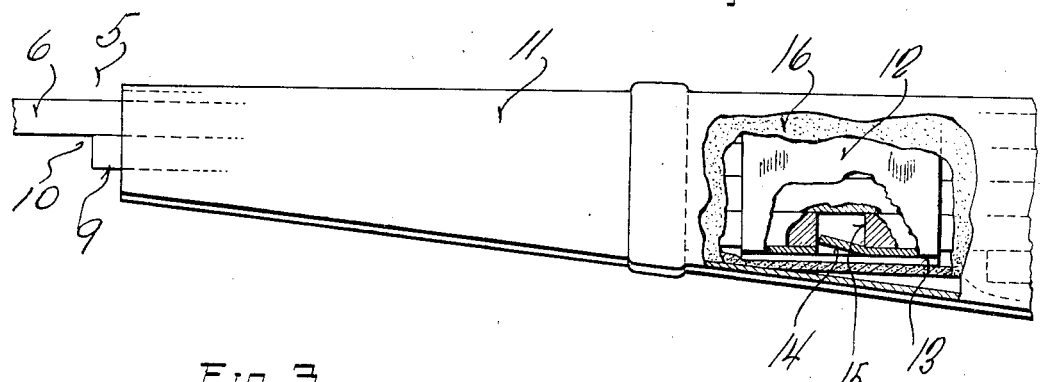
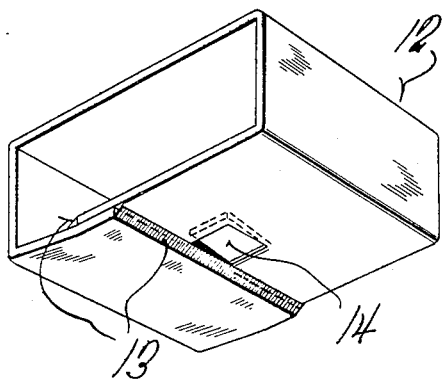
Inventor
Stephen F. Briggs
By Ira Milton Jones
Attorney Patented Feb. 6, 1934

1,945,801

UNITED STATES PATENT OFFICE 1,945,801

VEHICLE LEAF SPRING CONSTRUCTION

Stephen F. Briggs, Chenequa, Wis., assignor to Briggs & Stratton Corporation, Milwaukee, Wis., a corporation of Delaware Application July 20, 1932. Serial No. 623,477

5 Claims. (Cl. 267—37)

This invention relates to certain new and useful improvements in vehicle leaf spring constructions and has as a general object to provide a retaining clip applicable to a spring beneath a metal cover without requiring the special provision therefor in the cover.

Another object of this invention is to provide a leaf retaining clip for vehicle leaf springs which may be slipped over the end of the spring and has means for automatically securing the same in position.

And a more specific object of this invention resides in the provision of a band-like looped retaining member to be slipped over the end of a leaf spring, and from which a tang is struck to engage in a recess formed in one of the leaves of the spring and secure the clip against removal.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, one complete example of the physical embodiment of this invention is illustrated constructed according to the best mode so far devised for the practical application of the principles thereof, and in which:

Figure 1 is a perspective view of one end of a vehicle leaf spring illustrating the application of this invention thereto;

Figure 2 is a side view of the spring end portion with parts broken away and in section to illustrate structural details; and Figure 3 is a perspective view of the retaining clip per se.

Referring now more particularly to the accompanying drawing, the numeral 5 indicates a vehicle leaf spring, only one end of which is shown. The spring comprises a main leaf 6, the ends of which are curled as at 7 to receive bearing bushings 8, and a plurality of auxiliary leaves 9 which, as is customary, are disposed beneath the main leaf and are successively shorter in length, with the outer end portions forming a series of steps 10 at the underside of the spring. The entire plurality of leaves may be secured together at the center of the spring in any suitable manner (not shown).

The ends of the spring heretofore, have been held against spreading by U shaped clips which were fitted down over the spring to have their lower ends connected by bolts. This type of spring clip, by reason of its inherent construction, was large and consequently could not be enclosed by a metal spring cover without special provision in the cover.

This invention, therefore, contemplates a spring clip which may be enclosed in a conventional metal spring cover 11 without requiring any special provision in the cover for the clip. With this end in view, a band 12 is fitted over the spring adjacent its ends.

This band 12 preferably is formed of flat steel approximately $\frac{1}{16}$th of an inch thick and of convenient width. The ends of the strip forming the band are lapped and welded together as at 13, or they may be secured in any other suitable manner.

As shown, the loop of the band is rectangular to fit the cross section of the spring at a point adjacent its ends where the thickness of the spring consists of only part of its total number of leaves, so that the band will be held against inward movement by the end of the next adjacent leaf.

Retraction of the band from the spring is prevented by a tang 14 struck in from the lower portion of the band to engage in an aperture or recess 15 formed in the adjacent spring leaf. The tang 14 engages in the recess 15 automatically as the clip is applied to the spring.

By positioning the clip or band on the spring with its lapped ends lowermost, it is apparent that the presence of the clip results in a projection of only $\frac{1}{16}$th of an inch at the sides and top of the spring, and that at the bottom, even though the thickness of the band is doubled because of the lapped joint, there is no projection effecting the spring cover as the clip is so located that all portions of its bottom lie within the adjacent step 10 or within an imaginary line connecting the lower corners of the ends of the adjacent leaves.

As is customary, in the application of metal spring covers, the spring is wrapped with a suitable fabric 16 to retain the lubricant, and as this layer of fabric is more or less yieldable it follows that the presence of the thin clip has no effect on the metal cover 11 and from the exterior the presence of the clip is not noticeable.

From the foregoing description taken in connection with the accompanying drawing, it will be readily apparent to those skilled in the art to which an invention of this character appertains, that this invention provides simple, but highly effective means for retaining the leaves of a vehicle leaf spring against spreading; and that a metal spring cover may be applied over the retaining means without resulting in objectionable protrusions in the cover.

What I claim as my invention is:

1. A spring clip for securing the leaves of a vehicle leaf spring against separation comprising a strip of relatively thin flat metal having its ends secured together to form an endless band adapted to be slipped over the end of the spring, and a resilient tang struck inwardly from the band to automatically snap into a recess in the spring as the clip is moved longitudinally along the spring to hold the clip against retraction, 2. In combination with a vehicle leaf spring comprising, a plurality of successively shorter leaves with their staggered ends forming a series of steps along the bottom of the spring, means for retaining the leaves of the spring against spreading comprising a relatively thin strip of metal having its end suitably joined together to provide a continuous band adapted to encircle the leaves of the spring, said band being longitudinally applicable over the end of the spring and having its joined ends disposed at the bottom of the spring to be located in the space defined by one of said steps at the bottom of the spring so that no portion of the band protrudes beyond a plane connecting the ends of the two adjacent leaves, and means to automatically secure said band in said position as it is applied to the spring.

3. In combination with a vehicle leaf spring comprising a plurality of successively shorter leaves with their staggered ends forming a series of steps along the bottom of the spring, a metal cover fitting the spring closely at its sides, top and bottom whereby the cover together with the steps along the bottom of the spring defines triangular spaces, a clip to hold the leaves of the spring against spreading, said clip comprising a band of relatively thin metal having its ends securely connected and encircling the spring with its connected ends disposed in one of said triangular spaces, so as to enable application of the cover to the spring with the cover fitting closely against the stepped bottom and without requiring special provision in the cover to accommodate said part of the clip, and a fabric wrapping encircling the spring and the clip, the resiliency of the fabric wrapping accommodating the slight protrusion beyond the sides and top of the spring formed by the thickness of the clip so as to enable the cover to fit closely at the sides and top of the spring without special provision in the cover.

4. In combination with a vehicle leaf spring comprising a plurality of successively shorter leaves with their staggered ends forming a series of steps along the bottom of the spring, a metal cover fitting the spring closely at its sides, top and bottom whereby the cover together with the steps along the bottom of the spring defines triangular spaces, a clip to hold the leaves of the spring against spreading, said clip comprising a band of relatively thin metal having its ends securely connected and encircling the spring with its connected ends disposed in one of said triangular spaces, so as to enable application of the cover to the spring with the cover fitting closely against the stepped bottom and without requiring special provision in the cover to accommodate said part of the clip, a fabric wrapping encircling the spring and the clip, the resiliency of the fabric wrapping accommodating the slight protrusion beyond the sides and top of the spring formed by the thickness of the clip so as to enable the cover to fit closely at the sides and top of the spring without special provision in the cover, and a resilient tang struck from the clip and automatically engageable in a recess in the spring upon movement of the clip onto the spring to hold the clip in its proper position.

5. In combination with a vehicle leaf spring comprising a plurality of successively shorter leaves with their staggered ends forming a series of steps along the bottom of the spring, a metal cover fitting the spring closely at its sides, top and bottom whereby the cover together with the steps along the bottom of the spring defines triangular spaces, a clip to hold the leaves of the spring against spreading, said clip comprising a band of relatively thin metal having its ends securely connected and encircling the spring with its portion of greatest thickness disposed in one of said triangular spaces, so as to enable application of the cover to the spring with the cover fitting closely against the stepped bottom and without requiring special provision in the cover to accommodate said part of the clip, and a fabric wrapping encircling the spring and the clip, the resiliency of the fabric wrapping accommodating the slight protrusion beyond the sides and top of the spring formed by the thickness of the clip so as to enable the cover to fit closely at the sides and top of the spring without special provision in the cover.

STEPHEN F. BRIGGS.